United States Patent [19]
Noda

[11] Patent Number: 6,101,049
[45] Date of Patent: Aug. 8, 2000

[54] LENS USED FOR PICTURE IMAGE READING AND PICTURE IMAGE READER THAT USES IT

[75] Inventor: Takayuki Noda, Urawa, Japan

[73] Assignee: Fuji Photo Optical Co., Ltd., Omiya, Japan

[21] Appl. No.: 09/249,162

[22] Filed: Feb. 12, 1999

[30] Foreign Application Priority Data

Feb. 25, 1998 [JP] Japan .................................. 10-060519
Dec. 1, 1998 [JP] Japan .................................. 10-341392

[51] Int. Cl.$^7$ ...................................................... G02B 9/62
[52] U.S. Cl. ............................................. 359/760; 359/759
[58] Field of Search ..................................... 359/760, 759

[56] References Cited

U.S. PATENT DOCUMENTS 5,388,003  2/1995  Naganuma et al. ..................... 359/649
5,920,434  7/1999  Mori ........................................ 359/663

FOREIGN PATENT DOCUMENTS 4-31368   5/1992  Japan .
7-140383  6/1995  Japan .

*Primary Examiner*—Georgia Epps
*Assistant Examiner*—Tim Thompson
*Attorney, Agent, or Firm*—Arnold International; Bruce Y. Arnold

[57] ABSTRACT

A lens used for picture image reading that consists of six lens elements arranged as a deformed Gauss type lens, and an improved image reader which uses the lens. By establishing the lens elements to be of prescribed shapes and so that certain specified conditions are satisfied, a lens having high resolution, with the various aberrations being favorably corrected over a wide range of wavelengths, is provided. Further, the manufacturing costs of the lens are lowered. The lens includes, in order from the object side: a first lens element $L_1$ of a positive meniscus shape, a second lens element $L_2$ of a positive meniscus shape, a third lens element $L_3$ of a negative meniscus shape with its concave surface on image side, a fourth lens element $L_4$ of a negative meniscus shape with its concave surface on the object side, a positive fifth lens element $L_5$, and a positive sixth lens element $L_6$ with its convex surface on the image side.

5 Claims, 4 Drawing Sheets

◀──── OBJECT SIDE

LENS USED FOR PICTURE IMAGE READING AND PICTURE IMAGE READER THAT USES IT

BACKGROUND OF THE INVENTION

In picture image readers such as prior art facsimiles and scanners, a solid state image sensor is generally used having a CCD array of detectors arranged in the image plane. In recent years, the trend towards higher definition of pixels in CCD arrays has been rapid. Accompanying this trend, it has become necessary to use higher resolution lenses in picture image readers.

Moreover, the development of color picture image readers that read color manuscripts by splitting white light into light of three primary colors (e.g., red, blue and green) has been rapid. Thus, lenses have become necessary which have small aberrations over a wide range of wavelengths as compared to a lens required by a monochrome picture image reader.

As for prior art lenses that are used for picture image reading there are, for example, deformed Gauss-type, six lens element, lenses disclosed in Japanese Laid Open Patent Publication H04-31368 (Japanese Patent Application No. Sho 59-246132) and Japanese Laid Open Patent Publication H07-140383.

In the lens described in Japanese Laid Open Patent Publication H04-31368, there is a problem in that the distortion is large. In the lens described in Japanese Laid Open Patent Publication H07-140383, there is the problem that the manufacturing costs are high because expensive glass material is necessary for the high refractive index material that is used.

BRIEF SUMMARY OF THE INVENTION

The present invention relates to a deformed Gauss-type lens, and the use of such a lens in picture image readers such as facsimiles or color scanners.

A first object of the invention is to provide a lens useful for picture image reading, thereby providing a lens having high resolution (i.e, small aberrations) over a wide range of wavelengths. A second object of the invention is to provide such a lens while keeping manufacturing costs low. A third object of the invention is to provide an improved picture image reader which uses the lens of the invention, thereby providing a picture image reader having high resolution and low manufacturing costs.

BRIEF DESCRIPTION OF THE DRAWINGS

The present invention win become more fully understood from the detailed description given below and the accompanying drawings, which are given by way of illustration only and thus are not limitative of the present invention, and wherein.

DETAILED DESCRIPTION

The lens used for picture image reading of the present invention includes, in order from the object side: a first lens element of positive refractive power and a meniscus shape; a second lens element of positive refractive power and a meniscus shape; a third lens element of negative refractive power and a meniscus shape, with its concave surface on the image side; a fourth lens element of negative refractive power and having a concave surface on the object side; a fifth lens element of positive refractive power; and a sixth lens element of positive refractive power with a convex surface on the image side. Further, the lens is characterized by the fact that it satisfies the below Conditions (1), (2) and (3):

$0.37 < f_{12}/f < 0.55$      Condition (1)

$0.19 < R_3/f < 0.26$      Condition (2)

$0.14 < R_6/f < 0.23$      Condition (3)

where $f_{12}$ is the composite focal length of the first and second lens elements, f is the focal length of the lens, $R_3$ is the radius of curvature of the third surface, in order from the object side, and $R_6$ is the radius of curvature of the sixth surface, in order from the object side.

Furthermore, it is preferable that the lens of the invention also satisfy the following Conditions (4), (5), and (6):

$0.17 < |f_{34}/f| < 0.4$      Condition (4)

$0.98 < f_{456}/f < 1.6$      Condition (5)

$54 < (\nu_{d1} + \nu_{d3} + \nu_{d10} + \nu_{d12})/4 < 60$      Condition (6)

where, f is the composite focal length of the lens, $f_{34}$ is the composite focal length of the third lens element and the fourth lens element, in order from the object side, $f_{456}$ is the composite focal length of the fourth through sixth lens elements, in order from the object side, and $\nu_{d1}$, $\nu_{d3}$, $\nu_{d10}$, $\nu_{12}$ are the Abbe constants of the first, second, fifth and sixth lens elements, respectively, in order from the object side.

The improved picture image reader of the present invention is characterized by being constructed using the above-described picture image reading lens.

Figure 1:
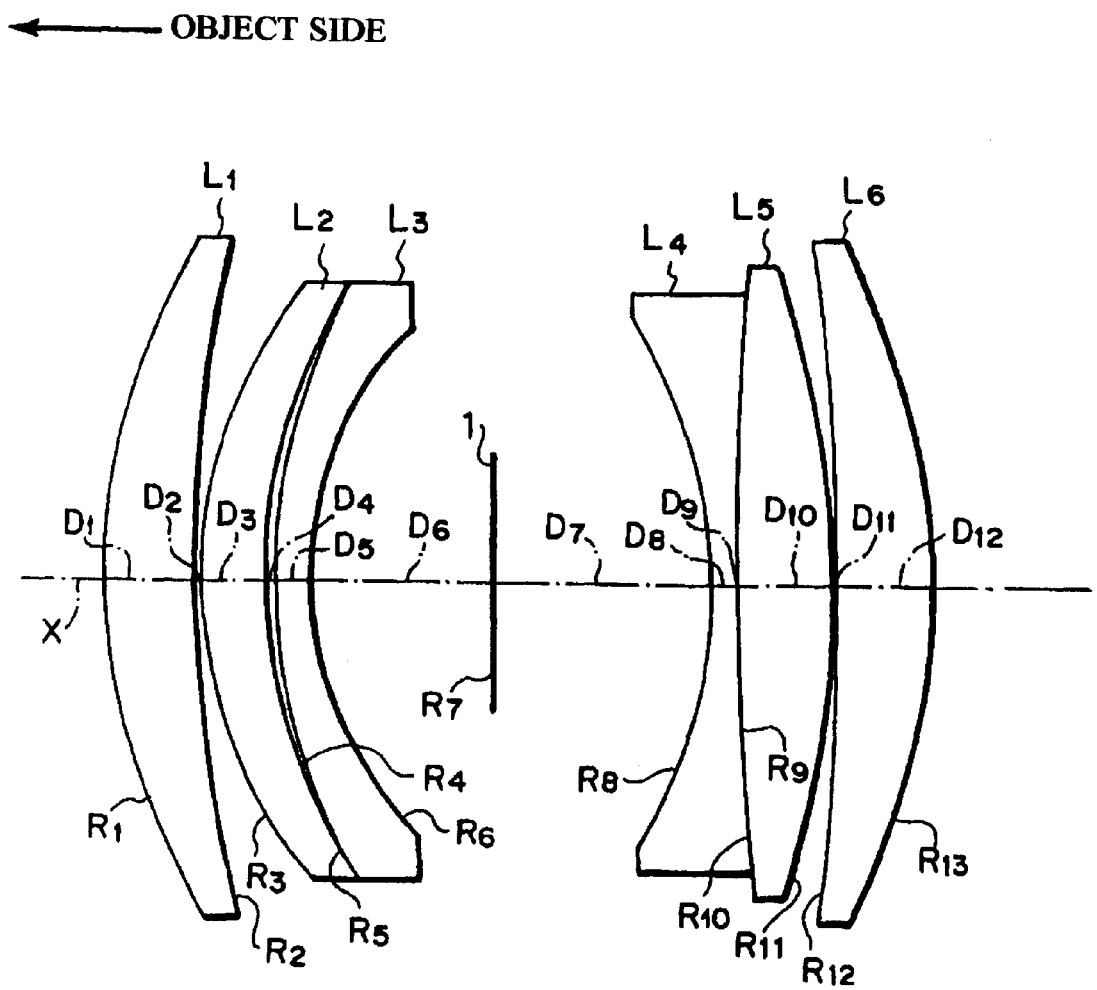
FIG. 1 shows the basic lens element structure of the lens of the present invention.

The present invention will now be described in detail, with reference to the drawings. FIG. 1 shows the basic lens element structure of the lens of the present invention, which is useful in a picture image reader such as a facsimile or color scanner.

As shown in FIG. 1, the lens of the present invention includes, in order from the object side, a first lens element $L_1$ composed of a positive meniscus lens with its convex surface on the object side; a second lens element $L_2$ composed of a positive meniscus lens with its convex surface on the object side; a third lens element $L_3$ composed of a negative meniscus lens with its concave surface on the image side; a diaphragm 1; a fourth lens element $L_4$ composed of a lens having surfaces of different radii of curvature, with the surface of stronger curvature on the object side; a fifth lens element $L_5$ composed of a lens having different radii of curvature on its opposite sides with the surface of stronger curvature on the image side; and a sixth lens element $L_6$ composed of a positive meniscus lens with its convex surface on the image side. Furthermore, in Embodiment 3, the fourth lens element $L_4$ is composed of a negative meniscus lens with its concave surface on the object side, and the fifth lens element $L_5$ is composed of a positive meniscus lens with its concave surface on the object side. Moreover, in Embodiment 3, the fourth lens element $L_4$ and the fifth lens element $L_5$ are cemented together.

Condition (1) above regulates the ratio of the composite focal length $f_{12}$ of the first and second lens elements $L_1$ and $L_2$ divided by the focal length of the lens. When the $f_{12}/f$ value exceeds the upper limit or drops below the lower limit, the generation of various aberrations such as coma and astigmatism becomes too large for these aberrations to be corrected.

Condition (2) above regulates the ratio of the radius of curvature $R_3$ of the third surface from the object side divided by the focal length f of lens. When the $R_3/f$ value exceeds the upper limit, correction of the coma becomes insufficient. On the other hand, when the $R_3/f$ value drops below the lower limit, the coma is over-corrected.

Condition (3) above ensures that there will be high contrast over the entire image field, and also ensures that the curvature of field is favorably corrected by regulating the ratio of the sixth surface from the object side divided by the focal length f of the lens. When the $R_6/f$ value exceeds the upper limit or drops below the lower limit, the Petzval sum becomes unsuitable, and it becomes difficult to provide high contrast over the entire image field because of the generation of coma with convergence and flair, along with an increase in the curvature of field.

Condition (4) above makes the power of the air lens, which is formed between the two lens element surfaces that face the diaphragm 1, be within a range of appropriate values by regulating the ratio of the composite focal length $f_{34}$ of the third lens element L3 and fourth lens element $L_4$, divided by the focal length f of the lens. When the absolute value of $f_{34}$ exceeds the upper limit, there is excessive generation of sagittal flare and coma. On the other hand, when the absolute value of $f_{34}/f$ drops below the lower limit, there is difficulty in correcting aberrations that are generated by the positive lens.

Condition (5) above balances the refractive power of the rear lens group to that of the lens by regulating the ratio of the composite focal length $f_{456}$ of the fourth through sixth lens elements divided by the focal length f of the lens. When the value of $f_{456}$ exceeds the upper limit, the refractive power of the rear lens group becomes too strong, and higher order coma and the like are generated. On the other hand, when the value of $f_{456}/f$ drops below the lower limit, the generation of distortion becomes prominent. Moreover, if the value of $f_{456}/f$ is within the range of $1.2<f_{456}/f<1.55$, the various aberrations can be favorably corrected.

Condition (6) above is for favorably correcting chromatic aberrations on the optical axis X by regulating the average values of the Abbe constant $v_d$ of the first lens element $L_1$, the second lens element $L_2$, the fifth lens element $L_5$, and the sixth lens element $L_6$. When the value of $(v_{d1}+v_{d3}+v_{d10}+v_{d12})/4$ exceeds the upper limit or drops below the lower limit, the chromatic aberrations on the axis cannot be favorably corrected.

Hereinafter, examples of three embodiments of the invention will be given, for a lens having a standard focal length of 100 mm.

Embodiment 1

Table 1 shows the surface number # in order from the object side, the radius of curvature R (in mm) of each lens surface, the on-axis surface spacing D (in mm), the index of refraction $N_e$ for the e-line of each lens element, and the Abbe constant $v_d$ for each lens element of Embodiment 1. In the middle section of Table 1 are shown the focal length f of the lens, the magnification m, the half-field angle ω, and the standard wavelength $\lambda_0$ used for paraxial calculations of lens performance values. The lower section of Table 1 shows the values corresponding to the above Conditions (1) to (6) for Embodiment 1.

TABLE 1

| # | R | D | $N_e$ | $v_d$ |
|---|---|---|---|---|
| 1 | 30.29 | 4.54 | 1.7162 | 53.9 |
| 2 | 66.21 | 0.27 | | |
| 3 | 21.77 | 3.35 | 1.6413 | 55.5 |
| 4 | 25.52 | 0.43 | | |
| 5 | 28.11 | 1.73 | 1.7231 | 29.5 |
| 6 | 16.64 | 9.28 | | |
| 7 | diaphragm | 11.10 | | |
| 8 | −23.99 | 1.54 | 1.5510 | 45.9 |
| 9 | 175.71 | 0.02 | | |
| 10 | 175.71 | 4.83 | 1.5187 | 64.2 |
| 11 | −48.58 | 0.27 | | |
| 12 | −126.46 | 5.04 | 1.7162 | 53.9 |
| 13 | −33.52 | 0.0 | | |

| f | = | 100 mm |
| m | = | −0.25 |
| $\lambda_0$ | = | 546.07 nm |
| ω | = | 19.84° |

| Conditions: | (1) | $f_{12}/f$ | = | 0.5090 |
| | (2) | $R_3/f$ | = | 0.2177 |
| | (3) | $R_6/f$ | = | 0.1664 |
| | (4) | $f_{34}/f$ | = | −0.1960 |
| | (5) | $f_{456}/f$ | = | 1.441 |
| | (6) | $(v_{d1} + v_{d3} + v_{d10} + v_{d12})/4$ | = | 56.87 |

As is clear from the lower section of Table 1, each of the Conditions (1) to (6) are satisfied by Embodiment 1.

Embodiment 2

Table 2 shows the surface number # in order from the object side, the radius of curvature R (in mm) of each lens surface, the on-axis surface spacing D (in mm), the index of refraction $N_e$ for the e-line of each lens element, and the Abbe constant $v_d$ for each lens element of Embodiment 2. In the middle section of Table 2 are shown the focal length f of the lens, the magnification m, the half-field angle ω, and the standard wavelength $\lambda_0$ used for paraxial calculations of lens performance values. The lower section of Table 2 shows the values corresponding to the above Conditions (1) to (6) for Embodiment 2.

TABLE 2

| # | R | D | $N_e$ | $v_d$ |
|---|---|---|---|---|
| 1 | 30.24 | 3.95 | 1.7162 | 53.9 |
| 2 | 66.69 | 0.38 | | |
| 3 | 21.79 | 2.47 | 1.6413 | 55.5 |
| 4 | 25.38 | 0.33 | | |
| 5 | 27.98 | 3.17 | 1.7462 | 28.2 |
| 6 | 16.55 | 8.09 | | |
| 7 | diaphragm | 12.14 | | |
| 8 | −23.85 | 1.71 | 1.5510 | 45.9 |
| 9 | 175.65 | 0.01 | | |
| 10 | 175.65 | 5.44 | 1.5187 | 64.2 |
| 11 | −48.49 | 0.27 | | |
| 12 | −128.11 | 4.43 | 1.7162 | 53.9 |
| 13 | −33.44 | 0.0 | | |

| f | = | 100 nm |
| m | = | −0.189 |
| $\lambda_0$ | = | 546.07 nm |
| ω | = | 17.10° |

| Conditions: | (1) | $f_{12}/f$ | = | 0.5262 |
| | (2) | $R_3/f$ | = | 0.2179 |
| | (3) | $R_6/f$ | = | 0.1655 |
| | (4) | $f_{34}/f$ | = | −0.2001 |

TABLE 2-continued

| | | | |
|---|---|---|---|
| (5) | $f_{456}/f$ | = | 1.398 |
| (6) | $(v_{d1} + v_{d3} + v_{d10} + v_{d12})/4$ | = | 56.87 |

As is clear from the lower section of Table 2, each of the Conditions (1) to (6) are satisfied by Embodiment 2.

Embodiment 3

Table 3 shows the surface number # in order from the object side, the radius of curvature R (in mm) of each lens surface, the on-axis surface spacing D (in mm), the index of refraction $N_e$ for the e-line of each lens element, and the Abbe constant $v_d$ for each lens element of Embodiment 3. In the middle section of Table 3 are shown the focal length f of the lens, the magnification m, the half-field angle ω, and the standard wavelength $\lambda_0$ used for paraxial calculations of lens performance values. The lower section of Table 3 shows the values corresponding to the above Conditions (1) to (6) for Embodiment 3.

TABLE 3

| # | R | D | $N_e$ | $v_d$ |
|---|---|---|---|---|
| 1 | 28.17 | 4.06 | 1.7162 | 53.9 |
| 2 | 60.66 | 0.20 | | |
| 3 | 23.62 | 3.58 | 1.6413 | 55.5 |
| 4 | 37.06 | 0.31 | | |
| 5 | 42.95 | 1.39 | 1.6300 | 35.6 |
| 6 | 15.81 | 9.65 | | |
| 7 | diaphragm | 12.44 | | |
| 8 | −25.79 | 1.74 | 1.5705 | 42.8 |
| 9 | −958.94 | 0.0 | | |
| 10 | −958.94 | 3.14 | 1.5187 | 64.2 |
| 11 | −56.43 | 0.19 | | |
| 12 | −122.23 | 4.46 | 1.7162 | 53.9 |
| 13 | −30.52 | 0.0 | | |

| | | |
|---|---|---|
| f | = | 100 mm |
| m | = | −0.2524 |
| $\lambda_0$ | = | 546.07 nm |
| ω | = | 18.12° |

| Conditions: | | | |
|---|---|---|---|
| (1) | $f_{12}/f$ | = | 0.3991 |
| (2) | $R_3/f$ | = | 0.2362 |
| (3) | $R_6/f$ | = | 0.1581 |
| (4) | $f_{34}/f$ | = | −0.1746 |
| (5) | $f_{456}/f$ | = | 1.2849 |
| (6) | $(v_{d1} + v_{d3} + v_{d10} + v_{d12})/4$ | = | 56.85 |

As is clear from the lower section of Table 3, each of the Conditions (1) to (6) are satisfied by Embodiment 3.

Figure 2:
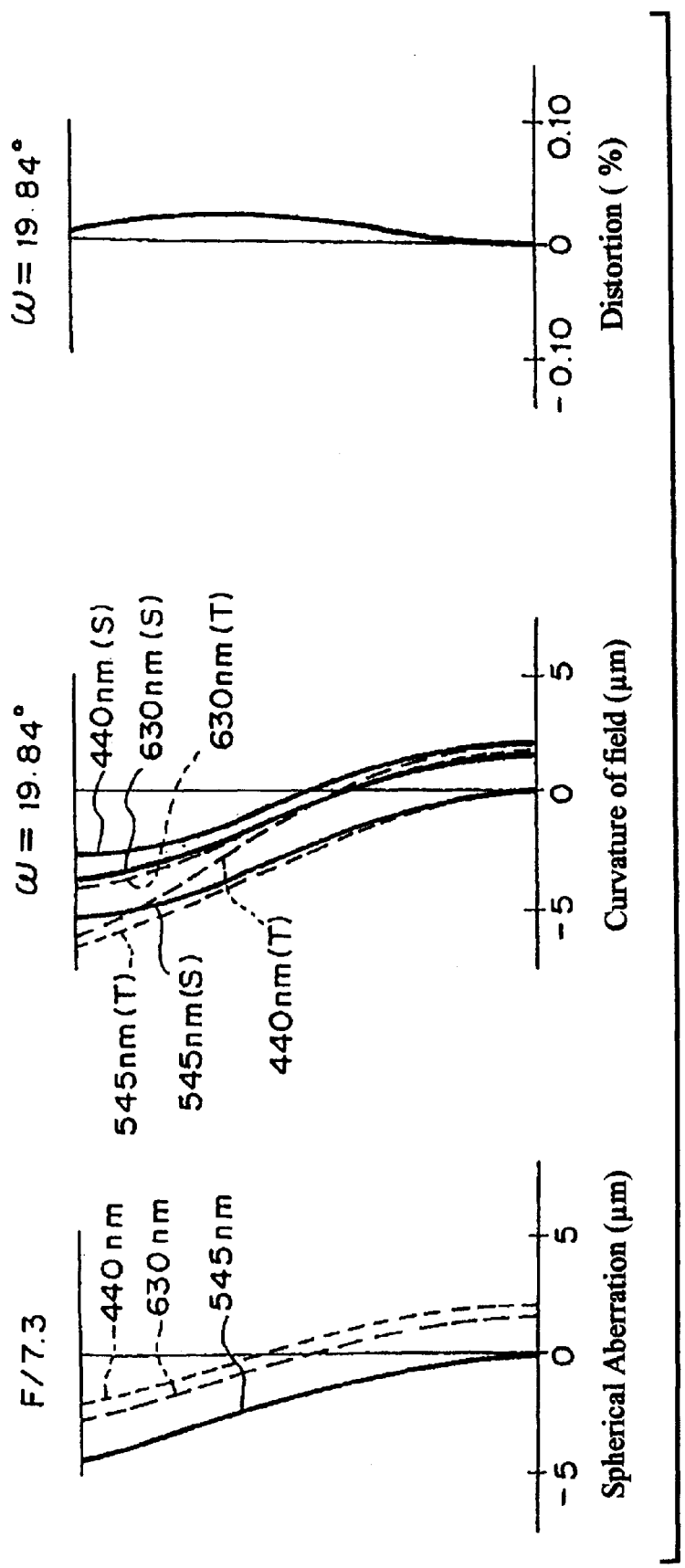
FIG. 2 shows the spherical aberration, field curvature and distortion of the lens of Embodiment 1.
Figure 3:
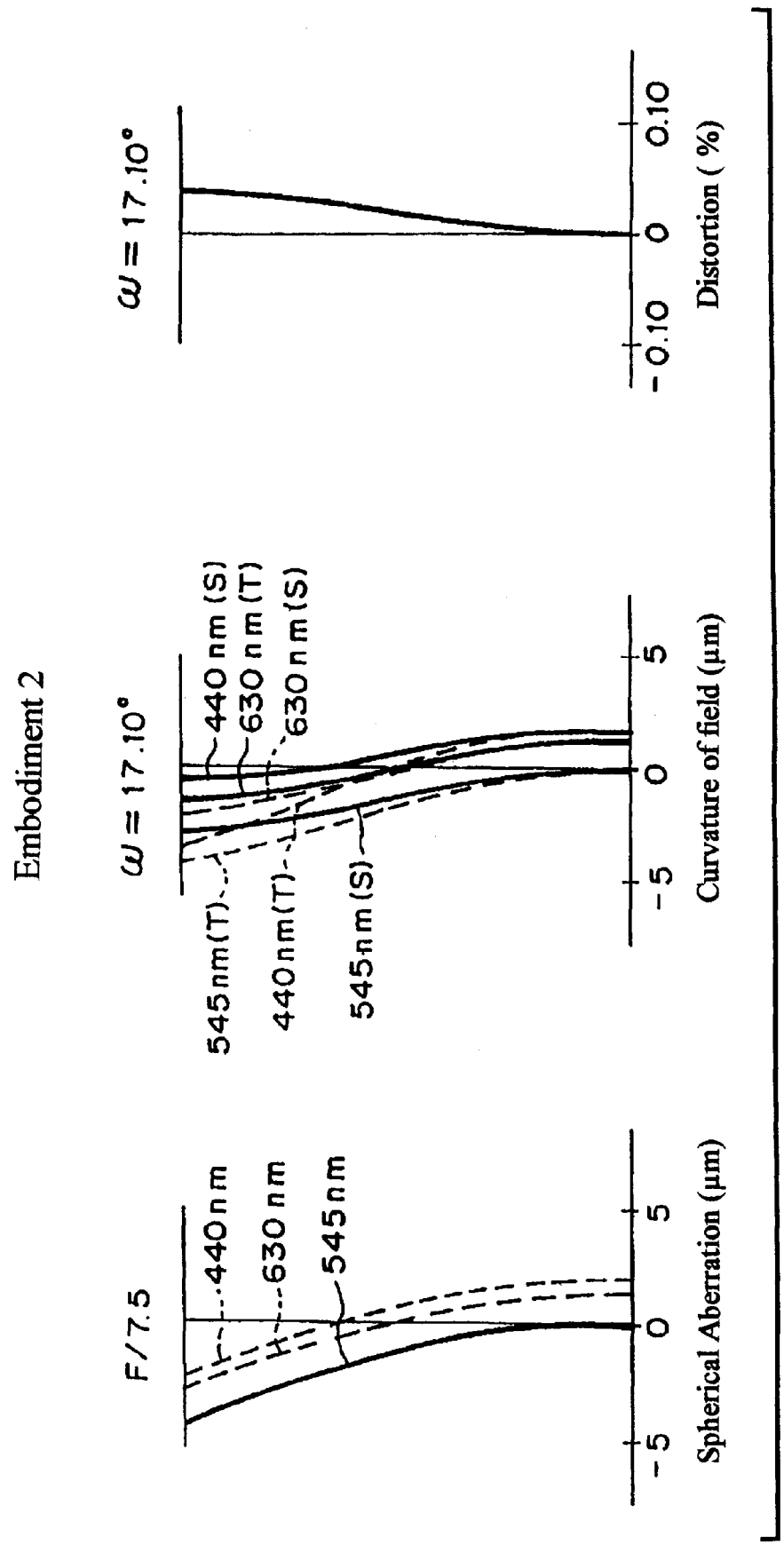
FIG. 3 shows the spherical aberration, field curvature and distortion of the lens of Embodiment 2.
Figure 4:
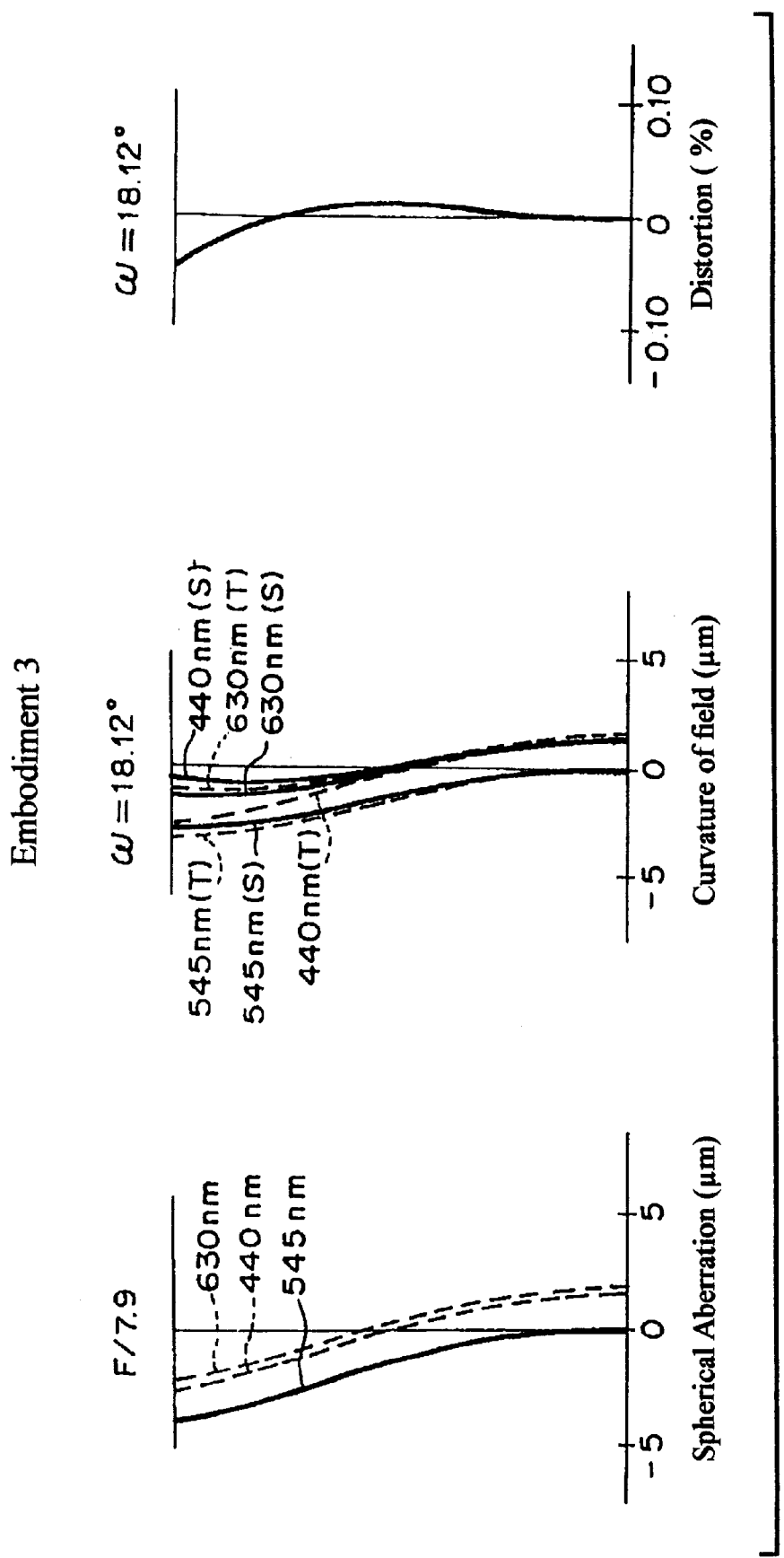
FIG. 4 shows the spherical aberration, field curvature and distortion of the lens of Embodiment 3.

FIGS. 2–4 show the spherical aberration, curvature of field, and distortion corresponding to Embodiments 1–3, respectively. Furthermore, the spherical aberration and the curvature of field of the sagittal (S) and the tangential (T) image surfaces corresponding to the wavelengths 545.0 nm, 440.0 nm, and 630.0 nm are shown, as well as the distortion corresponding to a wavelength of 545.0 nm As is clear from FIGS. 2–4, all of the above-mentioned aberrations can be favorably corrected for each embodiment of the invention.

In summary, the image reading lens of the present invention provides high resolution over a wide range of wavelengths, and the manufacturing costs are low as compared with prior art lenses used for picture image reading. By employing the lens of the present invention in picture image readers such as facsimile machines or color scanners, picture image readers can be made to have a flat image field and high resolution over a wide range of wavelengths at lower cost than previously.

The invention being thus described, it will be obvious that the same may be varied in many ways. For example, although the specific embodiments given above are for a lens having a standard focal length of 100 mm, the values given may be readily scaled by those of ordinary skill in the art to provide a different focal length lens, based on the desired resolution and manuscript size. Such variations are not to be regarded as a departure from the spirit and scope of the invention. Rather the scope of the invention shall be defined as set forth in the following claims and their legal equivalents. All such modifications as would be obvious to one of ordinary skill in the art are intended to be included within the scope of the following claims.

What is claimed is:

1. A lens used for picture image reading comprising, in order from the object side:

a first lens element of positive refractive power and meniscus shape;

a second lens element of positive refractive power and meniscus shape;

a third lens element of negative refractive power and meniscus shape, with its concave surface on the image side;

a fourth lens element of negative refractive power with a concave surface on the object side;

a fifth lens element which has positive refractive power; and a sixth lens element of positive refractive power with a convex surface on the image side; wherein the following conditions are satisfied:

$$0.19 < R_3/f < 0.26$$

$$0.14 < R_6/f < 0.23$$

where $R_3$ and $R_6$ are the radii of curvature of the third and sixth surfaces, respectively, in order from the object side, and f is the focal length of the lens.

2. The lens of claim 1, and which further satisfies the following condition $$0.37 < f_{12}/f < 0.55$$

where $f_{12}$ is the composite focal length of the first and second lens elements.

3. The lens of claim 2, and which further satisfies the following condition $$0.17 < |f_{34}/f| < 0.4$$

where $f_{34}$ is the composite focal length of the third and fourth lens elements.

4. The lens of claim 3, and which further satisfies the following condition $$0.98 < f_{456}/f < 1.6$$

where $f_{456}$ is the composite focal length of the fourth though sixth lens elements.

5. The lens of claim 4, and which further satisfies the following condition $$54 < (v_{d1} + v_{d3} + v_{d10} + v_{d12})/4 < 60$$

where $v_{d1}$, $v_{d3}$, $v_{d10}$ and $v_{d12}$ are the Abbe constants of the first, second, fifth and sixth lens elements, respectively, in order from the object side.

* * * * *

UNITED STATES PATENT AND TRADEMARK OFFICE
CERTIFICATE OF CORRECTION

PATENT NO : 6,101,049
DATED : Aug. 8, 2000
INVENTOR(S): Noda

It is certified that error appears in the above-identified patent and that said Letters Patent are hereby corrected as shown below:

In TABLE 3, third column, fifth line, change "1.39" to -- 1.89 --;

Signed and Sealed this

Seventeenth Day of April, 2001

Attest:

NICHOLAS P. GODICI

Attesting Officer

Acting Director of the United States Patent and Trademark Office